United States Patent
Tyagi et al.

(10) Patent No.: US 9,436,717 B2
(45) Date of Patent: Sep. 6, 2016

(54) METHOD AND APPARATUS FOR MANAGING CALENDAR ENTRIES IN A DOCUMENT

(71) Applicant: Adobe Systems Incorporated, San Jose, CA (US)

(72) Inventors: Vaibhav Tyagi, Noida (IN); Tarun Beri, Dist. Ludhiana (IN); Ankit Pangasa, Delhi (IN); Anup, Noida (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 211 days.

(21) Appl. No.: 14/134,700

(22) Filed: Dec. 19, 2013

(65) Prior Publication Data

US 2015/0178331 A1    Jun. 25, 2015

(51) Int. Cl.
*G06F 17/30* (2006.01)
*G06F 7/00* (2006.01)
*G06F 21/60* (2013.01)
*G06Q 10/00* (2012.01)

(52) U.S. Cl.
CPC ......... *G06F 17/30312* (2013.01); *G06F 21/60* (2013.01); *G06Q 10/00* (2013.01)

(58) Field of Classification Search
CPC .............. G06F 17/30864; G06F 17/30867; G06F 17/30011; G06Q 10/10; G06Q 30/02
USPC .......................................................... 707/736
See application file for complete search history.

(56) References Cited

U.S. PATENT DOCUMENTS

| | | | |
|---|---|---|---|
| 2007/0150513 A1* | 6/2007 | Vanden Heuvel .... | G06F 17/278 |
| 2008/0079973 A1* | 4/2008 | Beus ...................... | G06Q 10/10 358/1.13 |
| 2012/0179606 A1* | 7/2012 | Sagi ..................... | G06Q 10/103 705/40 |
| 2013/0007648 A1* | 1/2013 | Gamon ................ | G06Q 10/109 715/771 |
| 2013/0290270 A1* | 10/2013 | Pareek .............. | G06F 17/30011 707/687 |

* cited by examiner

*Primary Examiner* — Usmaan Saeed
*Assistant Examiner* — Raquel Perez-Arroyo
(74) *Attorney, Agent, or Firm* — Keller Jolley Preece (57) ABSTRACT

A method for managing calendar entries in a document is provided. In one embodiment, a document comprising a calendar entry is accessed by an electronic device. The document is not a meeting invitation email. The calendar entry is then extracted from the document. Further, the calendar entry is included in a calendar of a user. An apparatus for substantially performing the method as described herein is also provided.

20 Claims, 6 Drawing Sheets

METHOD AND APPARATUS FOR MANAGING CALENDAR ENTRIES IN A DOCUMENT

BACKGROUND

As the world is moving towards paperless exchange of information, use of electronic documents, for example documents in Portable Document Format (PDF), is on the rise. The electronic documents typically include time-related information like due dates etc. However, to remind reviewers of the electronic documents of this time-related information, a sender has to send reminder emails and messages. Sending such emails and messages takes time and is an inefficient process for both the sender and the receiver. Therefore, there is a need for improved way of managing time-related information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for managing calendar entries in a document is provided. In one embodiment, a document comprising a calendar entry is received by an electronic device. The document is not a meeting invitation email. The calendar entry is then extracted from the document. Further, the calendar entry is included as a calendar entry in a calendar of a user without the document.

An apparatus for substantially performing the method as described herein is also provided.

While the procedure and apparatus is described herein by way of example for several embodiments and illustrative drawings, those skilled in the art will recognize that the procedure and apparatus for managing calendar entries in a document is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the procedure and apparatus for managing calendar entries in the document. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Overview

One prior procedure for reminding users (e.g. recipients) of time-related information includes, sending reminder emails and messages to a recipient. For example, a sender manually creates a "Meeting" invitation email including the time related information and then sends it to a recipient using email tools, such as Outlook® from Microsoft Corporation. The recipient then receives the "Meeting" invitation email using the Outlook and manually processes the "Meeting" invitation email to include it in Outlook calendar of the recipient. For example, the recipient manually selects any one option out of several options such as "Accept", "Decline", and "Tentatively Accept" available for the "Meeting" invitation email. Once the recipient accepts the "Meeting" invitation email, the "Meeting" invitation email is removed from the recipient's inbox and moved into Outlook calendar as an "Accepted" invitation. However, processing the "Meeting" invitation email manually takes time and is dependent on human input. In addition, the "Meeting" invitation email is only limited to emails and that too to email tools, such as Outlook. Also, manual processing puts an additional burden on the recipient to open the email tool and then to manually process the "Meeting" invitation email, thereby making the process susceptible to faults. In case the recipient does not open the email tool and process the "Meeting" invitation email then the recipient does not get any reminder and hence, the recipient may miss such calendar invites. More importantly, the calendar event may not include the context information of the "meeting" invitation email unless the recipient manually inputs that information. Therefore, there is a need for improved way of managing time-related information.

In accordance to embodiments of the present invention and as will be described in more detail below, one or more calendar entries are included in electronic documents, hereinafter referred to as document or documents. In addition, a procedure for managing calendar entries in the document is also described. In one embodiment, an author creates a document. In response to an input (e.g. selection of "Create Calendar Entry") from the author, a calendar entry is created and inserted inside the document. The calendar entry is created in the document as either an annotation or is embedded in structure of the document. The document is not a meeting invitation email.

In one embodiment, the author then sends the document to a recipient or a user. The document is then received and accessed by a software application (e.g. Adobe Acrobat or Adobe Reader or a browser plugin or any other way of implementing the software application) present on an electronic device (e.g. desktop computer, smartphone etc.) of the recipient. In one scenario, the author sends the document via email to the recipient. In another scenario, other ways (e.g. via pen drive, File Transfer Protocol (FTP) transfer etc.) of sending the document to the recipient can also be used. In yet another scenario, the author can upload the document to a cloud service (e.g., document management services offered by Adobe Systems Incorporated) and the document can be fetched by the recipient from the cloud service via a portal of the cloud service (e.g. www.acrobat.com). In all scenarios, the document is accessed, i.e. received or fetched or opened, using the electronic device of the recipient. The document can be accessed in response to a click input of the recipient or in response to any other input by any other means. For example, the recipient can login into the portal and open the document via a plugin installed in a browser of the electronic device. The electronic device of the recipient accesses the document using the software application in response to the input. The document is processed by the electronic device to extract the calendar entry from the document automatically. The calendar entry in the document includes time-related information. The calendar entry is then automatically included as a calendar entry in a calendar of the recipient with or without the document. In some scenarios, the calendar entry in the calendar of the recipient can include link to access the document. For example, the document can be stored on the electronic device of the recipient or on the cloud service instead of storing the document in the calendar entry in the calendar. A link (e.g. uniform resource locator or address) indicating the location of the document, stored on the electronic device or on the cloud service or any other storage repository accessible from the electronic device, is included in the calendar entry in the calendar of the recipient. The calendar of the recipient is present on the electronic device of the recipient and is in communication with the software application via application programming interfaces (APIs) provided by the calendar or APIs provided by the software application or via APIs provided by both. The calendar is automatically synced to reflect the calendar entry and provide reminders corresponding to the calendar entry to the recipient.

In another embodiment, the author then sends the document to a cloud service (e.g., document management services offered by Adobe Systems Incorporated). The document is received and accessed by a server supporting the document management services. In one scenario, the author sends the document via email to a dedicated email id, of a recipient, provided by the document management services. In another scenario, the author sends the document to an email id, other than the dedicated email id, of the recipient. Other ways, e.g. via pen drive, File Transfer Protocol (FTP) transfer etc., of sending the document to the recipient can also be used. The recipient then fetches the document from the email or from other ways through which the recipient receives the document, and uploads the document to the portal (e.g. www.acrobat.com) of the document management services. The upload also results in access of the document by the server. In both the scenarios, the document is accessed, i.e. received or fetched or opened, by the server. The document is processed by the server to extract the calendar entry from the document automatically. The calendar entry is then automatically included as an entry in a calendar of the recipient with or without the document. In one scenario, the calendar of the recipient can be a cloud based calendar provided by the document management services and in such scenario the calendar entry is pushed to the cloud service. The recipient accesses the calendar entry in the calendar by accessing the cloud service, via the portal, using login details. In another scenario, the calendar of the recipient is present on the electronic device of the recipient and is in sync with the document management services via APIs provided by the calendar present on the electronic device of the recipient or APIs provided by an application of the document management services present on the device of the recipient. The calendar is automatically synced to reflect the calendar entry and provide reminders corresponding to the calendar entry to the recipient.

In some embodiments, the calendar entry in the document can include other context information, such as amount due etc., if it is inputted by the author. In some embodiments, the author may not include such context information in the calendar entry in the document. However, since the document or the link to the document is included in the calendar entry made in the calendar of the recipient, the context information can still be accessed using the document or the link to the document. Hence, some embodiments advantageously provide access to the context information even though such information is not included by the author in the calendar entry in the document.

In various embodiments, automatic extraction of the calendar entry in the document eliminates manual intervention. Also, in one embodiment, when the document is processed by the server only the calendar entry needs to be sent to the recipient and not the entire document, bandwidth is saved.

Terms Definitions

A document is an electronic content that includes a calendar entry. In one example, the document includes at least some content, other than the calendar entry, and such content may or may not be related to the calendar entry. For example, the document can include a receipt of previously paid bill on first page and a new bill on the second page. The calendar entry in the document can be for making the new bill payment. Hence, the document includes some content, i.e. the new bill content on the second page, related to the calendar entry. Similarly, the document also includes some content, i.e. the paid bill content on the first page, not related to the calendar entry. The document in itself is not the calendar entry but a superset of the calendar entry plus some other content. In some embodiments, the document is not a meeting invitation email or any other email. Examples of the document include, but are not limited to, word processing file, portable document format, text file etc. In some embodiments, the document is accessed by a document processing application which is different than an email client application. Examples of the document processing application include Adobe Acrobat, Adobe Reader etc. while the email client application includes Gmail, Outlook, Yahoo mail etc. So, the document can also be accessed by the electronic device or the server that does not include the email client application.

A meeting invitation email is an email invitation that is processed by the email client application. The meeting invitation email in itself is a calendar entry and does not include any content other than the calendar entry.

A "calendar entry in a document" is an entry in the document that includes a date and a time, or includes a date, a time and a message. The calendar entry is stored in the document as an annotation or is embedded in a structure of the document. The calendar entry is created by an author of the document. The calendar entry also includes one or more tasks lists created by the author.

A "calendar entry in a calendar of a user or a recipient" is an entry in an electronic calendar of the recipient that includes a date and a time, or includes a date, a time and a message. Many calendar entries can be present in the calendar of the recipient.

A calendar is an electronic application that includes at least one of a cloud based calendar or an application present on an electronic device of the user or the recipient. The calendar includes one or more records of times and dates. In one embodiment, the calendar is a part of the email client application but different than the document processing application which receives the document and processes the document. In another embodiment, the calendar is an application separate from both the applications, i.e. the email client application and the document processing application which receives the document and processes the document. In addition, in some embodiments, the calendar in which the calendar entry is entered resides on the electronic device which is remote and different than a server processing the document. The calendar is capable of generating one or more reminders or alerts corresponding to the calendar entry. The alerts or reminders can be in visual format or audio format or text format or message format.

An electronic device is a device that processes documents to extract one or more calendar entries from the document. Examples of the electronic device includes, but are not limited to, server, desktop computer, laptop computer, notebook computer, tablet computer, smartphone, electronic content reader, touch screen device, gesture enabled device, or any other electronic device including one or more processors for processing the document.

A server is an electronic device that processes the document for extracting one or more calendar entries from the document. Examples of the server includes, but are not limited to, computing devices, processing devices, or any other device including one or more processors for processing the document.

An annotation is a portion of the document that includes a calendar entry. The annotation can be a document within the document.

An author is any person or entity that has access to the document and can add calendar entries to the document. Examples of the author includes, but are not limited to, banks sending credit card statements, user accessing the document via the electronic device etc.

A user or a recipient is any person or entity that receives the document. The user can open or access the document by providing a click input or any other input by any other means.

In the following discussion, an example environment is first described that is operable to employ techniques described herein. Following this, a section entitled "Example Procedures" describes some example procedures for managing calendar entries in a document in accordance with one or more embodiments. Finally, a section entitled "Example Screenshots" indicates managing the calendar entries in the document in accordance with one or more embodiments.

Example Environment

Figure 1:
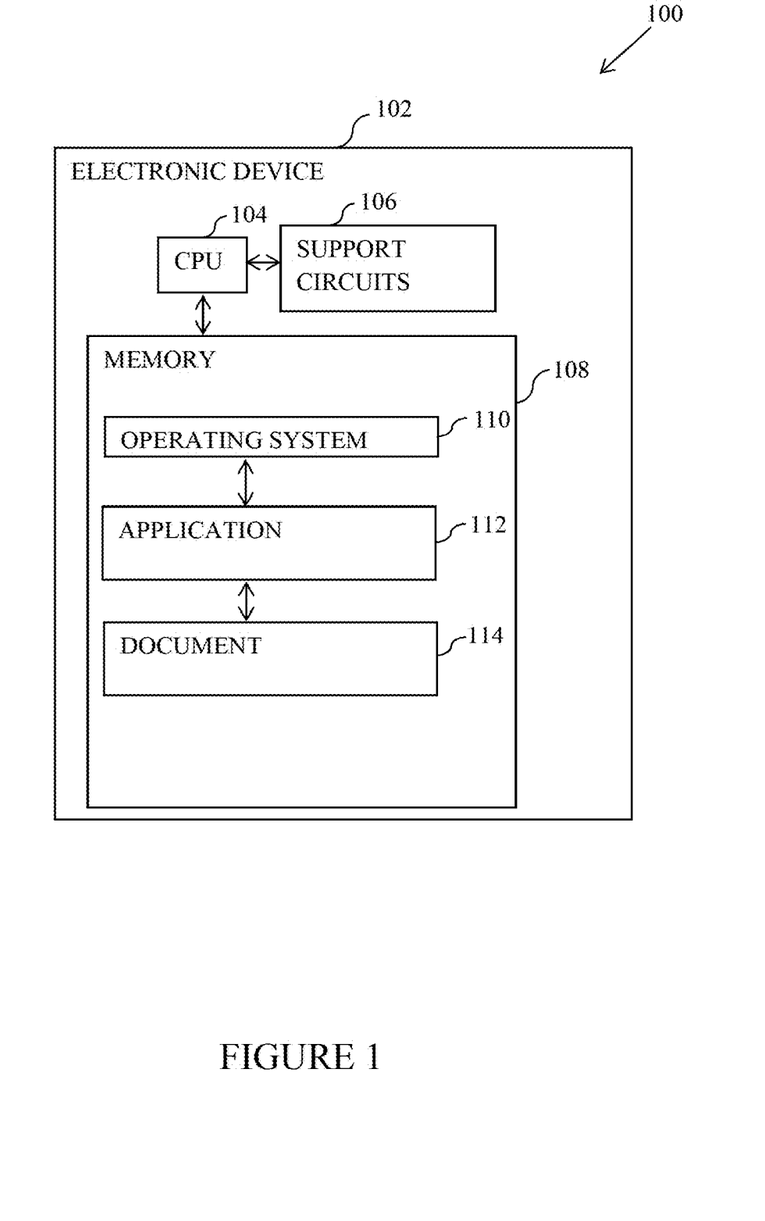
FIG. 1 is an environment for managing calendar entries in a document, according to one or more embodiments.

FIG. 1 is a block diagram of an apparatus 100 for managing calendar entries in a document, according to one or more embodiments. The apparatus 100 includes an electronic device 102. The electronic device 102 includes a Central Processing Unit (CPU) 104, support circuits 106, and a memory 108. The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, and the like. The memory 108 may include at least one of Read Only Memory (ROM), Random Access Memory (RAM), disk drive storage, optical storage, removable storage or the like. The memory 108 includes an operating system 110, and an application 112. The operating system 110 may include various commercially known operating systems.

Examples of the application 112 include, but are not limited to, word processing application, document processing application etc. In one embodiment, the application 112 includes Adobe Reader application or Acrobat application.

The apparatus 100 further includes one or more input devices (not shown in FIG. 1) connected to the electronic device 102. Examples of the one or more input devices include, but are not limited to, peripheral devices, keyboard, mouse etc. In some embodiments, the electronic device 102 may not be connected to the input devices separately and may have functionalities of these input devices built into the electronic device 102. For example, in cases in which the electronic device 102 is touch enabled device, gesture enabled device, or paired to such similar devices that act as the input devices.

In one embodiment, the electronic device 102 is a server. The application 112 accesses a document 114. The document 114 is received as an attachment to an email or is uploaded on the server via document service portal, such as www.acrobat.com. The document 114 includes one or more calendar entries. The calendar entries are included as annotations or are embedded in structure of the document 114. The application 112 processes the document 114 to extract the calendar entries from the document 114. The calendar entries are then entered into a calendar as calendar entries with or without document. In one example, the calendar is a cloud calendar maintained by the document service portal. The cloud calendar is accessible from one or more devices of a user or a recipient via the document service portal or other account authentication. In another example, the calendar entries are pushed as calendar entries in one or more calendars on the devices of the user. The calendar entries are pushed using the application programming interfaces (APIs) of the calendars on the devices. The server is accessible from the devices, and vice versa, via one or more networks (not shown in FIG. 1). Examples of the networks include, but are not limited to, internet, local area network (LAN), wireless area network, wired area network etc. The server includes or is connected to various circuits (not shown in FIG. 1) for enabling connectivity. Examples of the various circuits include, but are not limited to, LAN cards, modems, routers, internet cards etc.

In another embodiment, the electronic device 102 is a device of the user or the recipient. The application 112 accesses a document 114. The document 114 is received as an attachment to an email or via any other mode, for example file transfer from any other device or accessing the document by visiting the portal such as www.acrobat.com. The document 114 includes one or more calendar entries. The calendar entries are included as annotations or are embedded in structure of the document 114. The application 112 processes the document 114 to extract the calendar entries from the document 114. In one example, the calendar entries are then automatically entered into the calendar of the device as calendar entries with or without document. In another example, the calendar entries are displayed to the user of the client device when the user accesses the document 114. The user then chooses to export the calendar entries. The calendar of the device is then populated with the calendar entries in response to an input, i.e. selection of the calendar entries or corresponding button click, from the user. The device is connected to other devices via one or more networks (not shown in FIG. 1). The device includes or is connected to various circuits (not shown in FIG. 1) for enabling connectivity.

In some embodiments, an author of the document 114 inserts the calendar entries in the document 114. The calendar entries are inserted as annotations or are embedded in structure of the document. The author can also include one or more tasks list in the document 114.

In some embodiments, a calendar entry also includes a link to access the document 114. For example, the calendar entry includes a link for a folder on the device where the document 114 is stored. The document 114 is accessible from within the calendar entry even though the calendar entry does not include the document 114. When the document 114 is accessed, the list of the tasks included in the document 114 can also be displayed. Similarly, the link can be for the document 114 stored in the document service portal. In addition, the calendar entry can also include additional context information related to the calendar entries and already included in the document 114. For example, amount due, name of the sender, and address of the sender can be included in the calendar entry if the author has specified the context information in the calendar entry in the document 114.

Example Procedures

Figure 2:
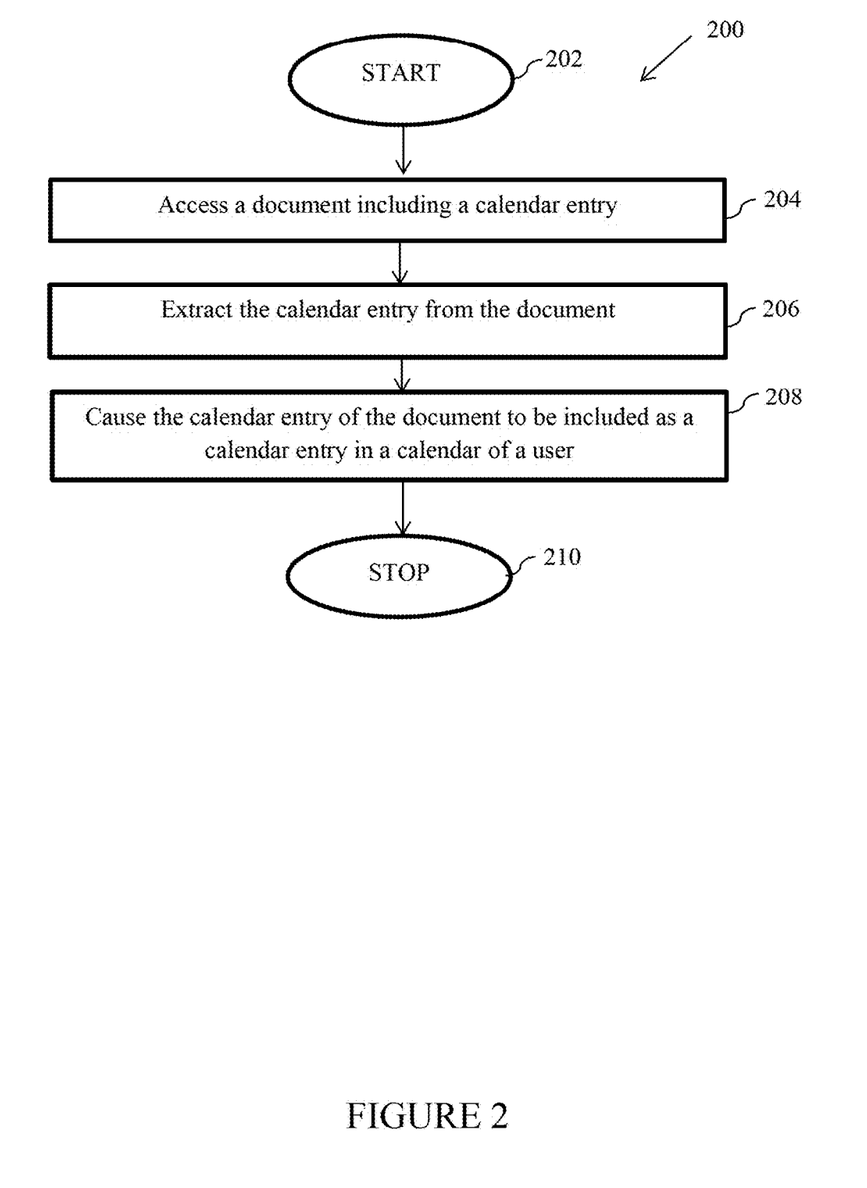
FIG. 2 is a flowchart of a procedure for managing calendar entries in the document, according to one or more embodiments.
Figure 3A:
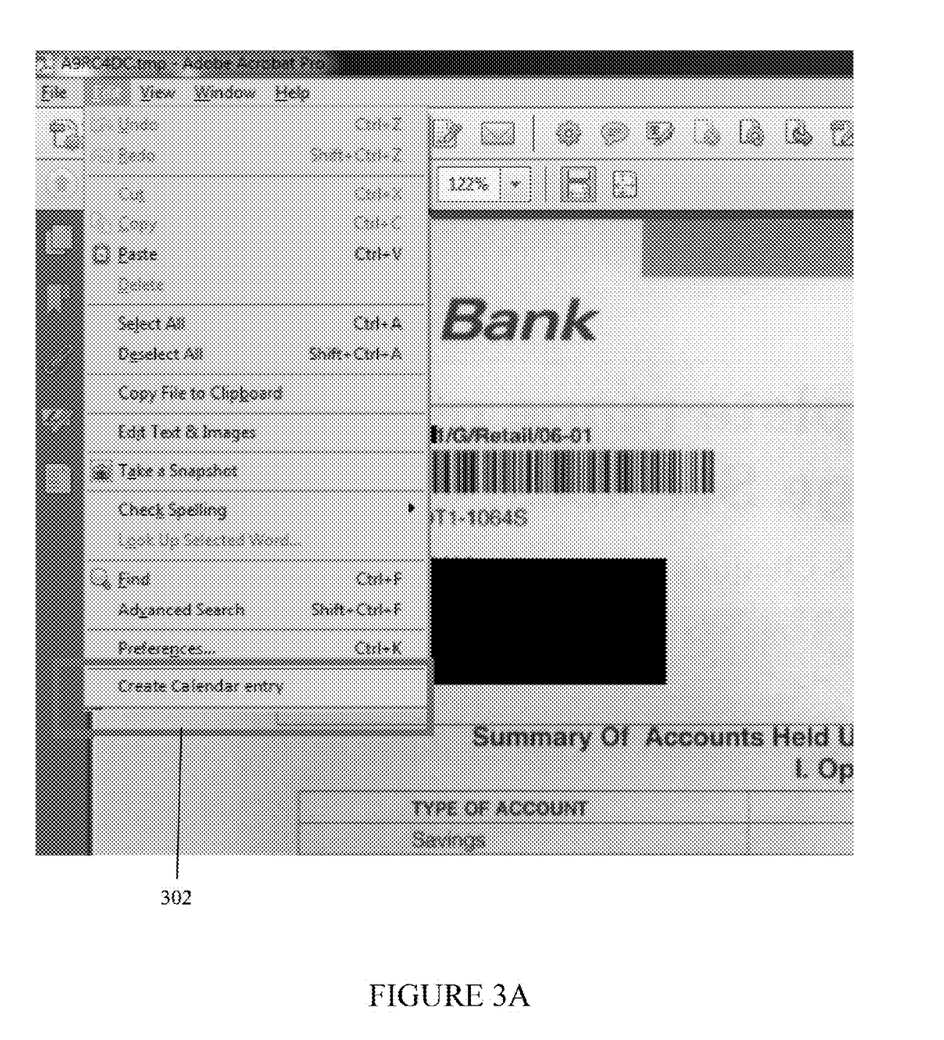
FIGS. 3A-3D are diagrams indicating managing calendar entries in a document, according to one or more embodiments.
Figure 3B:
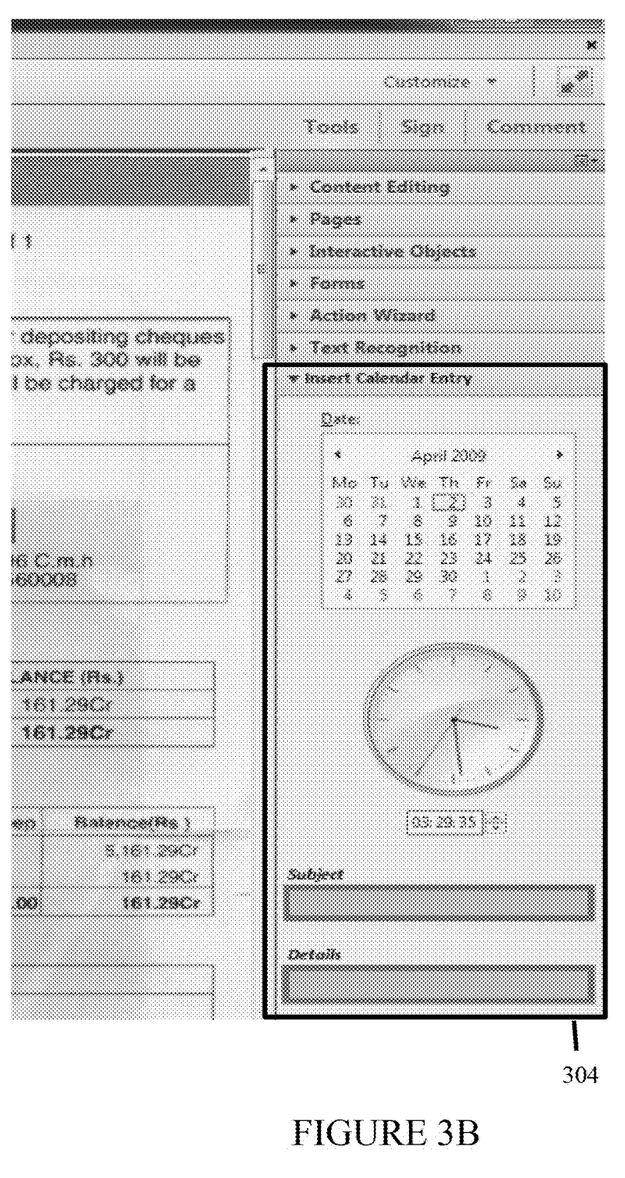
Figure 3C:
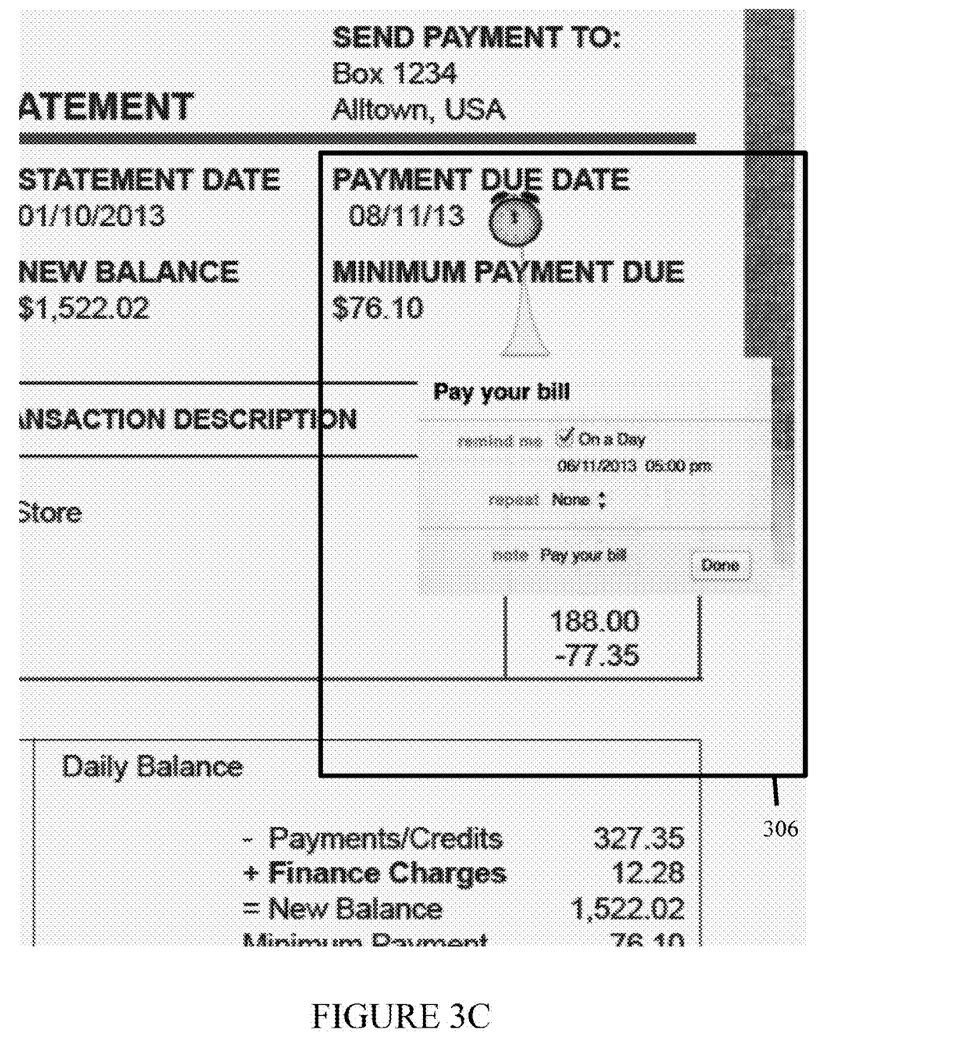
Figure 3D:
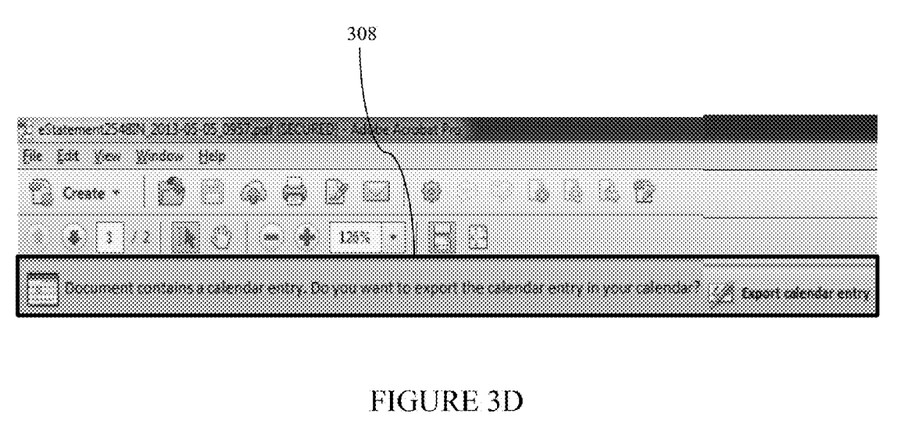

FIG. 2 is a flowchart of a procedure 200 for managing calendar entries in a document, for example the document 114, by an electronic device, for example the electronic device 102 of FIG. 1, according to one embodiment. In one embodiment, the electronic device 102 is the device of the recipient or the user, and in another embodiment, the electronic device 102 is the server.

The procedure starts at step 202 and proceeds to step 204.

At step 204, a document including at least one calendar entries is accessed. In one embodiment, the accessing includes receiving the document or fetching the document or opening the document or a combination of one or more of receiving, fetching and opening. The document is received as an attachment to an email or is uploaded on the server. The document can also be obtained via other means, for example pen drive, via FTP transfer etc. The document is not a meeting invitation email.

At step 206, the document is processed to extract the calendar entry from the document. The calendar entry is included either as an annotation or is embedded in the structure of the document. In one example, when the calendar entry is included as the annotation then the calendar entry is extracted from the annotation. In another example, when the calendar entry is embedded in the structure of the document then the structure of the document is parsed and the portion of the structure corresponding to the calendar entry is extracted. The calendar entry can be embedded in the document using extensible mark-up language (XML). An example of the structure including the calendar entry is now shown below.

```
<calendar-entry>
    <datetime> 20-10-2013 11:00am</datetime>
    <details> www.abc.xyz </details>
</calendar-entry>
```

In some embodiments, the document or the calendar entry also includes one or more tasks list and the list is also extracted. In addition, link to access the document is also extracted. For example, in case the document is present on the device of the user then the link of the folder is identified and extracted or in case the document is present on the document service portal then corresponding uniform resource locator (URL) is identified and extracted. Further, other information present in the calendar entry is also extracted. For example, amount to be paid, whom to pay, account number and other information included in the document and linked or related to the reminder.

In one embodiment, the extraction happens automatically. For example, when the server receives the document then the extraction happens. The document is received as an attachment to the email or is uploaded to the server. In another embodiment, the extraction happens in response to an input from the user. For example, the user accesses the document and clicks on a button, for example "export reminder as a calendar entry". In some cases the accessing of the document can be the input. Any other form of input, for example right click on the annotation and selection of "push to calendar", can be used. The calendar entries are displayed to the user when the document is accessed by the user.

In one embodiment, the calendar entry only includes the calendar entry related information and does not include attachments and does not include all other content of the document.

At step 208, the calendar entry is included as a calendar entry in a calendar of the user. The user has the device and the device includes the calendar. In one embodiment, the server causes entry of the calendar entry to be done in the calendar of the device via APIs of the calendar. For example, a portion of the document service portal running on the server syncs with another portion of the document service portal running on the device. During syncing the server pushes the calendar entry to the device. The calendar entry can be pushed to one or more devices of the user. Also, the server enables cloud based calendar and hence, the server can push the calendar entries as and when the calendar entries are extracted. In another embodiment, the device causes entry of the reminder to be done in the calendar of the device via APIs of the calendar. For example, when the user accesses the document then the device causes the calendar entry from the document to be pushed to other calendar applications present on the device.

In some embodiments, the calendar entry includes link to access the document and also other information related to the reminder. The calendar entries can then be used in various ways, for example providing alerts or notifications to the user. The calendar entry also helps the user in location the document using the link included in the calendar entry. The list of tasks can also be accessed via the calendar entry. The list can also be displayed within the document.

The procedure ends at step 210.

Example Snapshots

FIG. 3A-FIG. 3D illustrate managing calendar entries in a document, for example the document 114, according to one or more embodiments. An option 302 ("create calendar entry" button) is provided to the author of the document in response to the author accessing the document. The author clicks on the "create calendar entry" button or expands a tab 304 (shown in FIG. 3B) to insert a calendar entry in the document. In response to the input from the author, the tab 304 is expanded and the author can insert appropriate details, such as date, subject, details etc., to create the calendar entry. The document is then sent by the author to the user as an attachment to the email or uploaded into the account of the user. The account of the user is identified from the email, i.e. recipient email id, or from the login of the account into which the document is uploaded on the server. The recipient email id is unique for each recipient. In one embodiment, the calendar entry is created in the structure of the document. In another embodiment, the calendar entry is created as an annotation 306 shown in FIG. 3C.

The user then accesses the document via the device of the user. In one scenario, the document is accessed by the user using the device and the user sees an option 308 (shown in FIG. 3D) for exporting the calendar entry in the document as the calendar entry in the calendar of the user. The user clicks on the option 308 and the calendar entry is pushed as the calendar entry in the calendar of the user. In another scenario, the document is directly received by the server and automatically processed to extract the calendar entry and cause the calendar entry to be entered as the calendar entry in calendar of the user. In yet another scenario, the user clicks on the option 308 and the calendar entry is pushed to the server and automatically processed to cause the calendar entry to be entered as the calendar entry in calendar of the user.

Various other ways as discussed earlier can be used for accessing the document by the device or the server.

The embodiments of the present invention may be embodied as procedures, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution apparatus. In the context of this document, a computer-usable or computer-readable medium may be any medium that can contain, store, communicate, propagate, or transport the program for use by or in connection with the instruction execution apparatus, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

Examples of the computer-usable or computer-readable medium include, but are not limited to, an electronic, magnetic, optical, electromagnetic, infrared, or semiconductor apparatus, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java™, Smalltalk or C++, and the like or in scripting language, such as Perl, Python, PHP, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The procedures described herein may be implemented in software, hardware, or a combination thereof, in different embodiments. In addition, the order of procedures may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance.

In the foregoing detailed description, numerous specific details are set forth to provide a thorough understanding of claimed subject matter. However, it will be understood by those skilled in the art that claimed subject matter may be practiced without these specific details. For example, the claimed subject matter may be practiced by using different gestures or icons than that described. In other instances, procedures or apparatuses that would be known by one of ordinary skill have not been described in detail so as not to obscure claimed subject matter.

Some portions of the detailed description are presented in terms of algorithms or symbolic representations of operations on binary digital signals stored within a memory of a specific apparatus or specific electronic device or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Unless specifically stated otherwise, as apparent from the following discussion, it is appreciated that throughout this specification discussions utilizing terms such as "processing," "displaying," "receiving," "providing" or the like refer to actions or processes of a specific apparatus, such as a special purpose computer or a similar special purpose electronic device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic device.

Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A method comprising:
   receiving, at a server, a PDF document corresponding to a first user, wherein the PDF document is generated by a second user utilizing a remote computing device to embed an XML calendar entry as part of the PDF document;
   detecting, by at least one processor of the server, the XML calendar entry embedded as part of the PDF document by the second user utilizing the remote computing device;
   in response to receiving the PDF document and detecting the XML calendar entry, automatically extracting, by the at least one processor of the server, the XML calendar entry from the PDF document; and
   upon extracting the XML calendar entry from the PDF document, automatically causing a calendar event corresponding to the extracted XML calendar entry to be included in a digital calendar of the first user.

2. The method as claimed in claim 1, further comprising: detecting that the first user opened the PDF document via a computing device; and
   wherein detecting the XML calendar entry is in response to detecting that the first user opened the PDF document via the computing device.

3. The method as claimed in claim 1, further comprising: accessing, by the server, the PDF document; and
   wherein detecting the XML calendar entry, extracting the XML calendar entry, and causing the calendar event to be included in the digital calendar of the first user is in response to the server accessing the PDF document.

4. The method as claimed in claim 3, wherein automatically causing the calendar event corresponding to the extracted XML calendar entry to be included in the digital calendar of the first user further comprises:
   automatically pushing the calendar event to a plurality of computing devices of the first user.

5. The method as claimed in claim 1, wherein extracting the XML calendar entry from the PDF document comprises:
   parsing a structure of the PDF document, the structure comprising the XML calendar entry; and
   extracting the XML calendar entry from the structure.

6. The method as claimed in claim 1, further comprising:
   upon detecting that the first user opened the PDF document via a computing device, presenting for display a visual representation of the XML calendar entry to the first user with the PDF document.

7. The method as claimed in claim 1, wherein causing the calendar event corresponding to the extracted XML calendar entry to be included in the digital calendar of the first user comprises: causing the calendar event corresponding to the extracted XML calendar entry to be included in the digital calendar of the first user with a link to access the PDF document.

8. The method as claimed in claim 1, further comprising:
   extracting, from the XML calendar entry embedded as part of the PDF document by the second user utilizing the remote computing device, at least one of: an amount to be paid, an indication of whom to pay, or an account number.

9. The method as claimed in claim 8, wherein causing the calendar event corresponding to the extracted XML calendar entry to be included in the digital calendar of the first user comprises causing the calendar event to be included in the digital calendar with at least one of the following: the detected amount to be paid, the detected indication of whom to pay, or the detected account number.

10. A system comprising:
    at least one processor; and
    at least one non-transitory computer readable storage medium storing instructions that, when executed by the at least one processor, cause the system to:
    receive, at a server, a PDF document corresponding to a first user, wherein the PDF document is generated by a second user utilizing a remote computing device to embed a calendar entry in metadata of the PDF document;
    detect the calendar entry embedded in metadata of the PDF document by the second user utilizing the remote computing device;
    in response to receiving the PDF document and detecting the calendar entry embedded in metadata of the PDF document, extract the calendar entry from the metadata of the PDF document; and
    upon extracting the calendar entry from the metadata of the PDF document, cause a calendar event corresponding to the extracted calendar entry to be included in a digital calendar of the first user.

11. The system as claimed in claim 10, further comprising instructions that, when executed by the at least one processor, cause the system to:
    in response to the server receiving the PDF document and detecting the calendar entry embedded in the metadata of the PDF document, automatically extract the calendar entry from the metadata of the PDF document and automatically cause the calendar event corresponding to the extracted calendar entry to be included in the digital calendar of the first user.

12. The system as claimed in claim 10, further comprising instructions that, when executed by the at least one processor, cause the system to:
    receive user input from the first user in relation to a visual option displayed in the PDF document for exporting a calendar entry; and
    in response to receiving the user input, automatically cause the calendar event corresponding to the extracted calendar entry to be included in the digital calendar of the first user.

13. A non-transitory computer readable medium storing instructions thereon that, when executed by at least one processor, cause a computer system to:
    receive, at a server, a PDF document corresponding to a first user, wherein the PDF document is generated by a second user utilizing a remote computing device to embed an XML calendar entry as part of the PDF document;
    detect the XML calendar entry embedded as part of the PDF document by the second user utilizing the remote computing device;
    in response to receiving the PDF document and detecting the XML calendar entry, extract the XML calendar entry from the PDF document; and
    upon extracting the XML calendar entry from the PDF document, automatically cause a calendar event corresponding to the extracted XML calendar entry to be included in a digital calendar of the first user.

14. The non-transitory computer readable medium as claimed in claim 13, wherein the instructions, when executed by the at least one processor, further cause the computer system to: detect the XML calendar entry in response to
    detecting the first user opening the PDF document via a first computing device.

15. The non-transitory computer readable medium as claimed in claim 13, further comprising instructions that, when executed by the at least one processor, cause the system to:
    access, by the server, the PDF document without user input; and
    automatically detect the XML calendar entry, extract the XML calendar entry, and cause the calendar entry to be included in the digital calendar of the first user in response to the server accessing the PDF document without user input.

16. The non-transitory computer readable medium as claimed in claim 15, wherein automatically causing the calendar event corresponding to the extracted XML calendar entry to be included in the digital calendar of the first user further comprises:
    automatically pushing the calendar event to a plurality of computing devices of the first user.

17. The non-transitory computer readable medium as claimed in claim 13, wherein the instructions, when executed by the at least one processor, cause the computer system to extract the XML calendar entry from the PDF document by performing steps comprising:
    parsing a structure of the PDF document, the structure comprising the XML calendar entry; and
    extracting the XML calendar entry from the structure.

18. The non-transitory computer readable medium as claimed in claim 13, further comprising instructions that, when executed by the at least one processor, cause the computer system to: present for display a visual representation of the XML calendar entry to the first user with the PDF document, upon detecting that the first user has opened the PDF document via a computing device.

19. The non-transitory computer readable medium as claimed in claim 13, wherein the instructions, when executed by the at least one processor, cause the computer system to cause the calendar event corresponding to the extracted XML calendar entry to be included in the digital calendar of the user by causing the calendar event corresponding to the extracted XML calendar entry to be included in the digital calendar of the user with a link to access the PDF document.

20. The non-transitory computer readable medium as claimed in claim 19, further comprising instructions that, when executed by the at least one processor, cause the computer system to: provide access to the PDF document via the link.

* * * * *